United States Patent
Maruyama et al.

(10) Patent No.: US 8,224,467 B2
(45) Date of Patent: Jul. 17, 2012

(54) APPARATUS AND METHOD FOR CONTROLLING PERIPERAL DEVICE IN RESPONSE TO CONNECTION THERETO

(75) Inventors: Kiyoyasu Maruyama, Tokyo (JP); Kyosuke Yoshimoto, Tokyo (JP); Chihiro Morita, Tokyo (JP); Tokumichi Murakami, Tokyo (JP); Yoshiki Mizutani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 786 days.

(21) Appl. No.: 11/661,501

(22) PCT Filed: Aug. 31, 2005

(86) PCT No.: PCT/JP2005/015911
§ 371 (c)(1),
(2), (4) Date: Feb. 27, 2007

(87) PCT Pub. No.: WO2006/051642
PCT Pub. Date: May 18, 2006

(65) Prior Publication Data
US 2007/0270981 A1    Nov. 22, 2007

(30) Foreign Application Priority Data
Nov. 12, 2004 (JP) ................ 2004-329123

(51) Int. Cl.
*G05B 11/01* (2006.01)
(52) U.S. Cl. ............ 700/20; 348/571; 710/74; 359/334; 385/5
(58) Field of Classification Search .............. 700/20; 348/571; 710/74; 359/334; 385/5
See application file for complete search history.

(56) References Cited

U.S. PATENT DOCUMENTS

| | | | | |
|---|---|---|---|---|
| 5,887,193 A | * | 3/1999 | Takahashi et al. | 710/8 |
| 2003/0182456 A1 | | 9/2003 | Lin et al. | |
| 2004/0210321 A1 | * | 10/2004 | Hayashi et al. | 700/11 |
| 2004/0267987 A1 | | 12/2004 | Deng et al. | |
| 2006/0164550 A1 | | 7/2006 | Yoshimoto et al. | |

FOREIGN PATENT DOCUMENTS

| | | |
|---|---|---|
| JP | 2000-316005 A | 11/2000 |
| JP | 2001-149652 A | 6/2001 |
| JP | 2002-016619 A | 1/2002 |
| JP | 2003-084873 A | 3/2003 |
| JP | 2003-271533 A | 9/2003 |

OTHER PUBLICATIONS

Translation: JP 2001-149652 A (Yugen Kaisha Doshiru Entateinmento), Jun. 5, 2001.*

* cited by examiner

*Primary Examiner* — Kakali Chaki
*Assistant Examiner* — Tejal Gami
(74) *Attorney, Agent, or Firm* — Birch, Stewart, Kolasch & Birch, LLP

(57) ABSTRACT

An information processing apparatus in which its function can be improved by installing an additional module to an existing module in a module configuration system.
A video information processing apparatus 100, which is an existing module, has the function of reading, from a network module 150 as an additional module, software held in the network module 150. The software held in the network module 150 includes control software for the network module and software for making the control software available to the existing video information processing apparatus 100. The software held in the network module 150 is added to the video information processing apparatus 100, and the network module 150 is operated by the video information processing apparatus 100.

6 Claims, 10 Drawing Sheets

APPARATUS AND METHOD FOR CONTROLLING PERIPERAL DEVICE IN RESPONSE TO CONNECTION THERETO

TECHNICAL FIELD

This invention relates to an information processing apparatus that is applicable to a commercial device such as a digital television or HDD storage, or a professional device such as a recorder of a monitoring system, or FA device, and that enable connection of a network and a peripheral device such as a storage device to the body of the apparatus.

BACKGROUND ART

Because of the lower price and higher functions of personal computers, increase of Internet contents, and diversity of network connecting devices such as cell phones and PDAs, there is an increasing number of opportunities to use local LAN and the Internet not only in corporate offices but also at home. Also the standards like HAVi and ECHONET are being arranged so that consumer electronics can be connected to networks.

In these circumstances, for example, in the case of a conventional AV digital network device, an interface for network connection and the function for connecting to the network are provided within the one device (see, for example, Patent Reference 1).

Also, for example, in the case of connecting to a network a conventional television that does not have the function for connecting to the network, an interface for network connection and the function for connecting to the network must be additionally provided. In other words, if these are added, this television can be connected to the network and new functions can be added to the television.

Patent Reference 1: JP-A-2002-16619 (page 3-4, FIG. 1)

DISCLOSURE OF THE INVENTION

Problems that the Invention is to Solve

However, in the case of newly adding the up-to-date high-speed network function to a dedicated device like a television or adding a new function such as attaching a storage device for storing a large volume of data downloaded from a high-speed network, the device must be designed as an option device when it is developed. If the device is so designed, the device can be configured in advance for additional functions, thereby extending its functions.

However, if the device is not designed as an option device, the functions of the device cannot be easily extended. If the user wants to use a new function, the user must replace the entire device by buying a new one.

This invention has been made to solve the problems as described above, and its object is to provide an information processing apparatus in which a function can be easily added to an existing module.

Means for Solving the Problems

An information processing apparatus according to this invention includes a first module that has first control software installed therein and that has a CPU for executing the installed first control software, and a second module connected to the first module. The second module has second control software for making the second module operate, and the first module has a peripheral device controller that detects connection of the second module. When the connection of the second module is detected by the peripheral device controller, the CPU of the first module reads out the second control software from the second module and executes the read-out second control software, thereby making the second module operate.

Advantage of the Invention

As is described above, according to this invention, in the information processing apparatus including a first module that has first control software installed therein and that has a CPU for executing the installed first control software, and a second module connected to the first module, the second module has second control software for making the second module operate, and the first module has a peripheral device controller that detects connection of the second module. When the connection of the second module is detected by the peripheral device controller, the CPU of the first module reads out the second control software from the second module and executes the read-out second control software, thereby making the second module operate. Therefore, as the second module is added to the first module, the second control software for controlling the second module can be added, too. Thus, a high-function device can be constructed by adding the new second module.

BEST MODE FOR CARRYING OUT THE INVENTION

Embodiment 1

Hereinafter, Embodiment 1 of this invention will be described in detail, using an example where a network module is added to a video information processing apparatus such as a television.

FIG. 1 is a configuration view showing an information processing apparatus according to Embodiment 1 of this invention.

In FIG. 1, a video information processing apparatus 100 (first module) has a CPU (central processing unit) 101, a ROM (read-only memory) 102 and a RAM (random access memory) 103 connected by a system bus 110. The CPU 101 reads out a program (first control software) stored within the ROM 102 and executes processing by using the RAM 103.

A tuner 105 receives broadcast waves of television signals. A decoder 104 decodes the television signals (video signals) received by the tuner 105. The video signals decoded by the decoder 104 can also be controlled from the CPU 104. A video controller 106, under the control of the CPU 101, generates a display screen, or combines the video signals from the decoder 104 and outputs them to a monitor 120.

The video information processing apparatus 100 also has a peripheral device controller 107, and an interface (I/F) 108 to a peripheral device. The peripheral device controller 107 may be, for example, a USB (universal serial bus), controller like IEEE1394, PCI (peripheral component interconnect) or PCI-Express. The peripheral device controller 107 controls the peripheral device via the I/F 108 in accordance with the control by the CPU 101.

The video information processing apparatus 100 is configured, for example, as a digital television, as described above. If a network function is to be connected to this, it can be realized by connecting a network module 150 to the video information processing apparatus 100.

The network module 150 (second module) has an interface (I/F) 152 to be connected to the I/F 108 of the video information processing apparatus 100. The I/F 152 is connected with a module controller 151. The module controller 151 controls a ROM 153, a RAM 156 and a network controller 154. The network controller 154 performs network-related control and is connected to a network 121 via a network I/F 155.

The module controller 151 in its initial state is set to connect the I/F 152 with the ROM 153. In this ROM 153, a program (second control software) for making the network module 150 operate, is installed.

FIG. 2 is a view showing the configuration of the software installed in the ROM of the network module of the video information processing apparatus according to Embodiment 1 of this invention.

In FIG. 2, driver software 1532 for controlling the module controller 151, the RAM 156 and the network controller 154 carried on the network module 150, protocol software 1533 (control program) for the network, and application software 1534 (application program) are installed in the ROM 153. These are collectively handled by loading software 1531 (program to be added to the first module) for the main program of the video information processing apparatus 100 to load them to the video information processing apparatus 100.

The operation in the case of connecting such a network module 150 to the video information processing apparatus 100 will be described with reference to the flowchart of FIG. 3.

FIG. 3 is a flowchart showing the flow of software in the case of adding the network module of the information processing apparatus according to Embodiment 1 of this invention.

In FIG. 3, after power is turned on (step 300), each device (CPU 101, RAM 103, decoder 104, tuner 105, video controller 106 and peripheral device controller 107) is initialized in the video information processing apparatus 100 (step 301).

After that, the main program of the video information processing apparatus 100 is read out from the ROM 102 and executed (step 302).

In the main program, the peripheral device controller 107 searches for a peripheral device in a specific cycle (step 303). If a new peripheral device is not connected (determination of "NO" in step 304), the processing directly shifts to the main program operation (step 302).

If a new peripheral device is connected (determination of "YES" in step 304), that is, the network module 150 is connected, the main program reads out the loading software 1531 installed in the ROM 153 and executes it (step 310). That is, the CPU 101 accesses the network module 150 via the peripheral device controller 107 and reads out the loading software 1531 from the leading address of the ROM 153 via the module controller 151. Here, it is prescribed in advance that "the loading software 1531 is recorded at the leading address of the ROM 153". The processing up to this point is executed by the main program operating in the video information processing apparatus 100.

After that, the CPU 101 executes the processing of the loading software 1531. The loading software 1531 prescribes the order in which the driver software 1532, the protocol software 1533 and the application software 1534 are to be executed. The CPU 101 executes the software in that order.

That is, the driver software 1532 is executed (step 311), and the protocol software 1533 is executed (step 312). Then, the application software 1534 is added to the main program (step 313). Thus, the network module 150 will function as a part of the video information processing apparatus 100.

Here, the driver software 1532 is a program including an initial setting procedure for making the module controller 151 operate, an initial setting procedure for making the RAM 156 operate, that is, a memory use procedure program describing the capacity of the RAM, address information and the setting procedure, an initial setting procedure for making the network controller 154 operate, and a control procedure. In accordance with this driver software 1532, the CPU 101 controls the module controller 151, the RAM 156 and the network controller 154. The protocol software 1533 is the software for processing protocols in the network, and it is typically TCP/IP. The application software 1534 includes browser software, a player program for reproducing contents, and so on.

The browser software controls the video controller 106, for example, to display a homepage. In the case of displaying data broadcast, it controls the tuner 105 and the decoder 104. Moreover, the player program reproduces dynamic image contents downloaded by using the network module 150, and uses the decoder 104 in this case.

As the memory use procedure program included in the driver software 1532, that is, the program for making the RAM 156 available to (accessible from) the CPU 101, is executed, the RAM 156 of the network module 150 becomes available to the CPU 101 and is used as a memory area when executing the protocol software 1533 and the application software 1534.

According to Embodiment 1, if the network module is added to the existing module such as the video information processing apparatus, the control program for controlling the network module can be added, too. Therefore, as this new network module is added, a high-function device can be configured.

It suffices that only the function of reading the control program from the network module to be added is installed in the existing module such as the video information processing apparatus in advance. Therefore, a program or the like for the network module to be added need not be installed in the existing module, as a result, the memory capacity of the existing module can be reduced.

Moreover, the development of the network module to be added need not be the same time as the development of the existing module. At the time of developing the network module to be added, an optimum function can be installed and this can be connected to the existing module.

Also, since a memory is provided in the network module to be added and the existing module has means for utilizing the additional memory, higher functions can be added. It is not necessary to install many memories in the existing module, and only necessary memories are installed in the existing module, thereby enabling reduction in the cost.

Embodiment 2

In Embodiment 1, the RAM 156 of the network module 150 is made available by the driver software 1532 and becomes the memory area used for executing the protocol software 1533 and the application software 1534. In order for the RAM 156 to be accessed from the CPU 101, it is accessed via the peripheral device controller 107, the I/F 108, the I/F 152 and the module controller 151. Therefore, the access may be slower than the speed of access from the CPU 101 to the RAM 103. Thus, the operation in the case where the network module 150 is connected will be carried out as follows.

FIG. 10 is a flowchart showing the flow of software in the case where the network module 150 is connected to the video information processing apparatus 100. In FIG. 10, steps 300 to 304 are the same as in the flowchart shown in FIG. 3 and therefore will not be described further. In step 310, the loading software 1531 is read out and executed. In step 351, the driver software 1532 is executed. The memory use procedure program included in this driver software, that is, the program for making the RAM 156 available to (accessible from) the CPU 101, is executed, and the RAM 156 becomes available to the CPU 101. Next, an execution memory shift program included in the driver software 1532, that is, processing to make a change so that a part of the main program that operates in the RAM 103 will be executed in the RAM 156 and to open a part of the memory area of the RAM 103 (step 352), is executed. This processing is realized, for example, by changing the execution address of a part of task processing of the main program from the RAM 103 to the RAM 156.

Next, the protocol software 1533 is executed by using the RAM 103 (step 353). Also, the application software 1534 is added to the main program and is executed by using the RAM 103 (step 354).

According to Embodiment 2, the driver software 1532 enables the execution of the protocol software and the application software in the RAM 103, which can be accessed from the CPU 101 at a high speed. The high-function software to be added later can be processed by using the RAM device capable of high-speed processing.

Also, a change can be made so that a part of the program installed in the existing module such as the video information processing apparatus 100 will be executed on the memory provided in the added module. Also the software installed in the additional memory can be executed on the memory on the existing module. Therefore, the use of the memories can be optimized and the system performance can be improved.

Embodiment 3

Embodiment 3 will be described with respect to an example where an HDD module is added to a video information processing apparatus such as a television.

FIG. 4 is a configurational view showing an information processing apparatus according to Embodiment 3 of this invention.

In FIG. 4, 100 to 108, 110, 120 and 150 denote the same elements as in FIG. 1. A hub 130 is for connecting plural peripheral devices to the video information processing apparatus 100, and it may be, for example, a USB hub. Using this hub 130, the network module 150 and a hard disk module (hereinafter referred to as HDD module) 160 are connected. For the connecting order, the network module 150 is connected and then the HDD module 160 is connected.

The connection of the network module 150 is the same as in Embodiment 1 and therefore will not be described further.

The HDD module 160 has an interface (I/F) 162 that is connected to the video information processing apparatus 100. The I/F 162 is connected with a module controller 161. The module controller 161 controls a ROM 163, a RAM 166 and an HDD controller 164. The HDD controller 164 controls an HDD 165.

The module controller 161 in its initial state is set to connect the I/F 162 with the ROM 163. In this ROM 163, software for making the HDD module 160 operate is installed.

FIG. 5 is a view showing the configuration of software installed in the ROM of the HDD module of the information processing apparatus according to Embodiment 3 of this invention.

In FIG. 5, driver software 1632, file system software 1633 for accessing a file in the HDD 165, and application software 1634 to be executed in the case where the HDD module 160 is connected, are installed in the ROM 163. These are collectively handled by a loading program 1631 for the main program of the video information processing apparatus 100 to load them to the video information processing apparatus 100.

The operation in the case of connecting such an HDD module 160 to the video information processing apparatus 100 via the hub 130 will be described with reference to the flowchart of FIG. 6.

FIG. 6 is a flowchart showing the flow of software in the case of adding the HDD module of the information processing apparatus according to Embodiment 3 of this invention.

In FIG. 6, the hub 130 is a device for connecting plural peripheral devices and the operation at the time of connection is similar to the case where the video information processing apparatus 100 and the HDD module 160 are directly connected with each other. Therefore, the operation of the hub will not be described further.

In the video information processing apparatus 100, the operation of the main program (step 302), the search for a peripheral device by the peripheral device controller 107 (step 303) and the determination of "NO" with respect to the presence of a new peripheral device (step 304) form a loop.

When the HDD module 160 is connected in this case, the determination with respect to the presence of a new peripheral device (step 304) will be "YES". The main program of the video information processing apparatus 100 reads out the loading software 1631 installed in the ROM 163 and executes it (step 320). The processing up to this point is executed by the main program operating in the video information processing apparatus 100.

After that, the CPU 101 executes processing of the loading software 1631. The loading software 1631 prescribes the order in which the driver software 1632, the file system software 1633 and the application software 1634 are to be executed. The CPU 101 executes the software in that order.

That is, the driver software 1632 is executed (step 321) and the file system software 1633 is executed (step 322). Then, the application software 1634 is added to the main program (step 323). Thus, the HDD module 160 will function as a part of the video information processing apparatus 100.

Here, the driver software 1632 is a program including an initial setting procedure for making the module controller 161 operate, an initial setting procedure for making the RAM 166 operate, that is, a memory use procedure program describing the capacity of the RAM, address information and the setting procedure, an initial setting procedure for making the HDD controller 164 operate, and a control procedure. In accordance with this driver software 1632, the CPU 101 controls the module controller 161, the RAM 166 and the HDD controller 164.

If a RAM file system or the like is installed in the RAM 103 of the video information processing apparatus 100, it can be used as the file system software 1633. However, file system software suitable for the HDD 165 can be installed and the HDD 165 can be used more effectively.

The RAM 166 of the HDD module 160 becomes available to the CPU 101 as the memory use procedure program included in the driver software 1632, that is, the program for making the RAM 166 available to (accessible from) the CPU 101, is executed. The RAM 166 is used as an additional RAM in the case where the capacity of the RAM 103 provided in the video information processing apparatus 100 becomes insufficient because of the addition of the file system software 1633 and the application software 1634.

According to Embodiment 3, the same effects as in Embodiment 1 can be achieved even when the HDD module is newly connected.

Embodiment 4

In Embodiment 3, the example where the HDD module 160 is connected to the video information processing apparatus is described. In Embodiment 4, an example will be described in which a disc module for accessing a disc medium such as a compact disc (CD) or digital versatile disk (DVD) is connected to the video information processing apparatus.

FIG. 7 is a configurational view showing an information processing apparatus according to Embodiment 4 of this invention.

In FIG. 7, 100 to 108, 110 and 120 are the same as in FIG. 1. A disc module 170 has an interface (I/F) 172 that is connected to the video information processing apparatus 100. The I/F 172 is connected with a module controller 171. The module controller 171 controls a ROM 173, a RAM 176 and a disc controller 174. The disc controller 174 controls a disc 175.

The module controller 171 in its initial state is set to connect the I/F 172 with the ROM 173. Software for making the disc module 170 operate is installed in this ROM 173.

FIG. 8 is a view showing the configuration of the software installed in the ROM of the disc module of the information processing apparatus according to Embodiment 4 of this invention.

In FIG. 8, driver software 1732, file system software 1733 for accessing the disc 175, and application software 1734 executed in the case where the disc module 170 is connected, are installed in the ROM 173. These are collectively handled by a loading program 1731 for the main program of the video information processing apparatus 100 to load them to the video information processing apparatus 100.

The operation in the case of connecting such a disc module 170 to the video information processing apparatus 100 will be described with reference to the flowchart of FIG. 9.

FIG. 9 is a flowchart showing the flow of software in the case of adding the disc module of the information processing apparatus according to Embodiment 4 of this invention.

In FIG. 9, in the video information processing apparatus 100, the operation of the main program (step 302), the search for a peripheral device by the peripheral device controller 107 (step 303) and the determination of "NO" with respect to the presence of a new peripheral device (step 304) form a loop.

When the disc module is connected in this case, the determination with respect to the presence of a new peripheral device (step 304) becomes "YES", and the main program of the vide information processing apparatus 100 reads out the loading software 1731 installed in the ROM 173 and executes it (step 330). The processing up to this point is executed by the main program operating in the video information processing apparatus 100.

After that, the CPU 101 executes processing of the loading software 1731. The loading software 1731 prescribes the order in which the driver software 1732, the file system software 1733 and the application software 1734 are to be executed. The CPU 101 executes the software in that order.

That is, the driver software 1732 is executed (step 331) and the file system software 1733 is executed (step 332). Then the application software 1734 is added to the main program (step 333). Thus, the disc module 170 will function as a part of the video information processing apparatus 100.

The driver software 1732 is a program including an initial setting procedure for making the module controller 171 operate, an initial setting procedure for making the RAM 176 operate, that is, a memory use procedure software describing the capacity of the RAM, address information and the setting procedure, an initial setting procedure for making the disc controller 174 operate, and a control procedure. In accordance with this driver software 1732, the CPU 101 controls the module controller 171, the RAM 176 and the disc controller 174.

The file system software 1733 used for accessing the disc 175 often varies depending on the disc 175. Only the file system software 1733 corresponding to the disc 175 that is controllable by the disc controller 174 can be installed.

The RAM 176 of the disc module 170 becomes available to the CPU 101 as the memory use procedure program included in the driver software 1732, that is, the program for making the RAM 176 available to (accessible from) the CPU 101, is executed. The RAM 176 is used as an additional RAM in the case where the capacity of the RAM 103 provided in the video information processing apparatus 100 becomes insufficient because of the addition of the file system software 1733 and the application software 1734.

According to Embodiment 4, the same effects as in Embodiment 1 can be achieved even when the disc module is newly connected.

Figure 1:
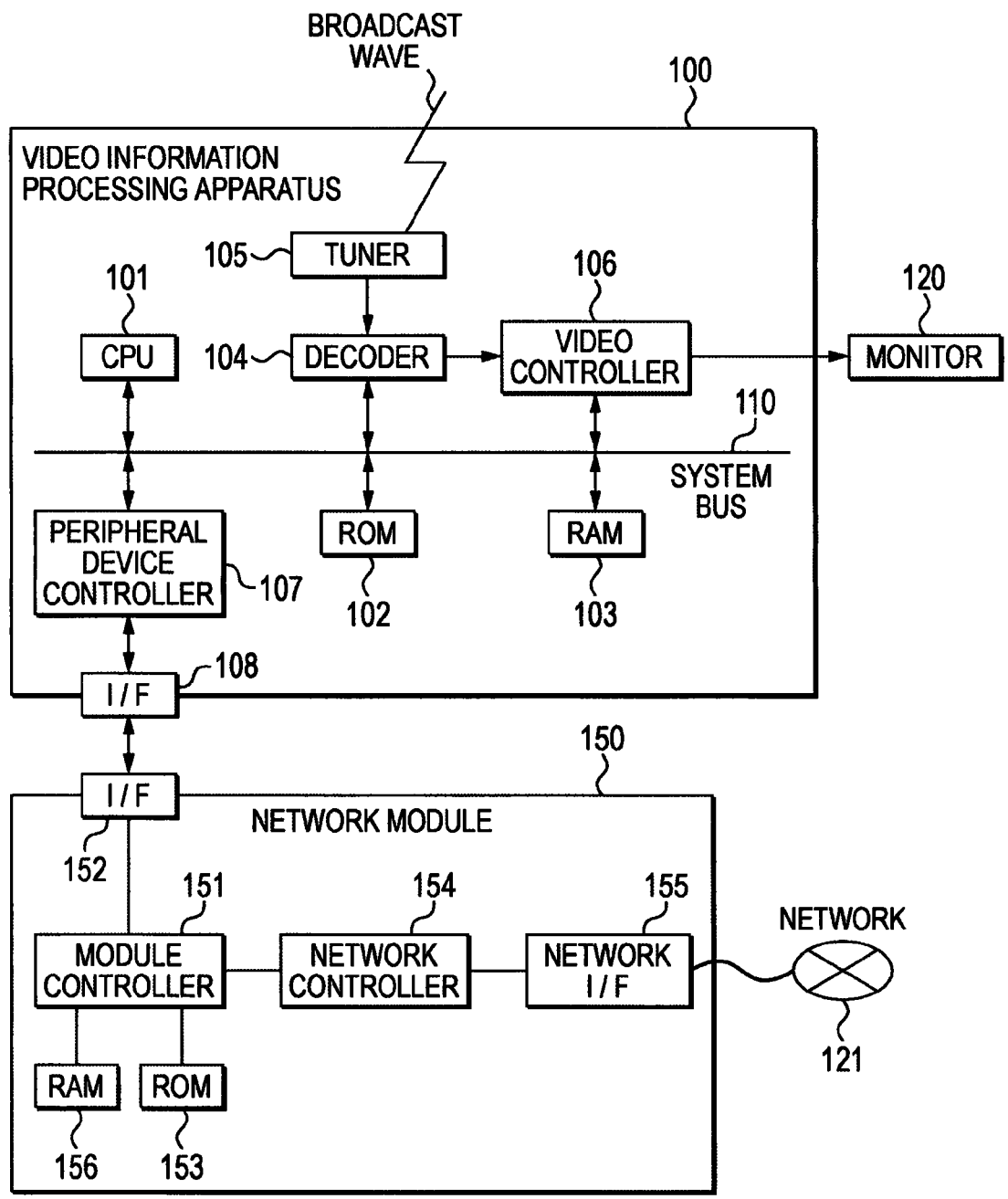
FIG. 1 is a configurational view showing the information processing apparatus according to Embodiment 1 of this invention.
Figure 2:
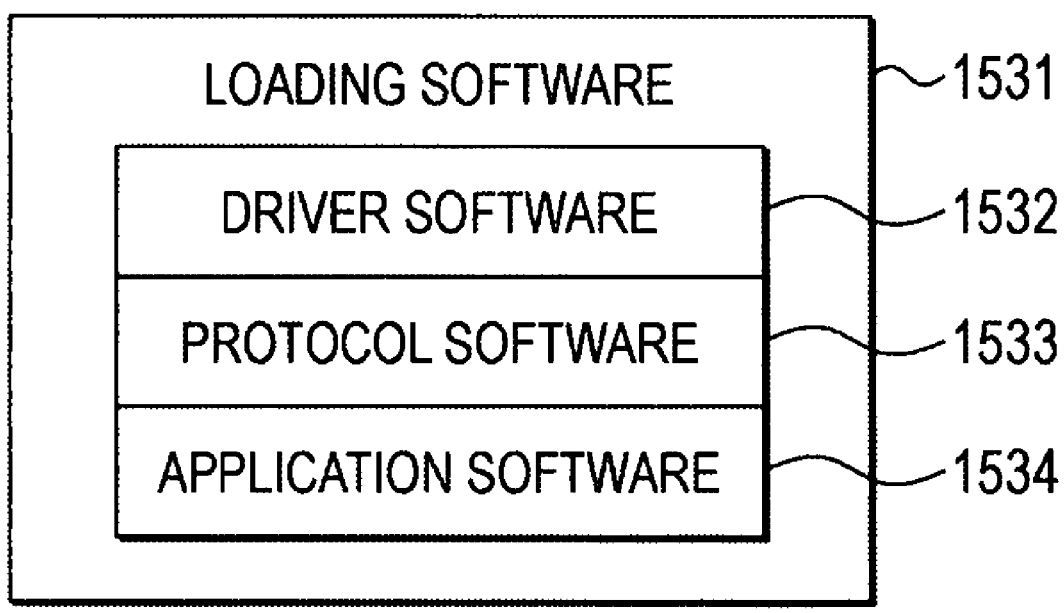
FIG. 2 is a view showing the configuration of the software installed in the ROM of the network module of the information processing apparatus according to Embodiment 1 of this invention.
Figure 3:
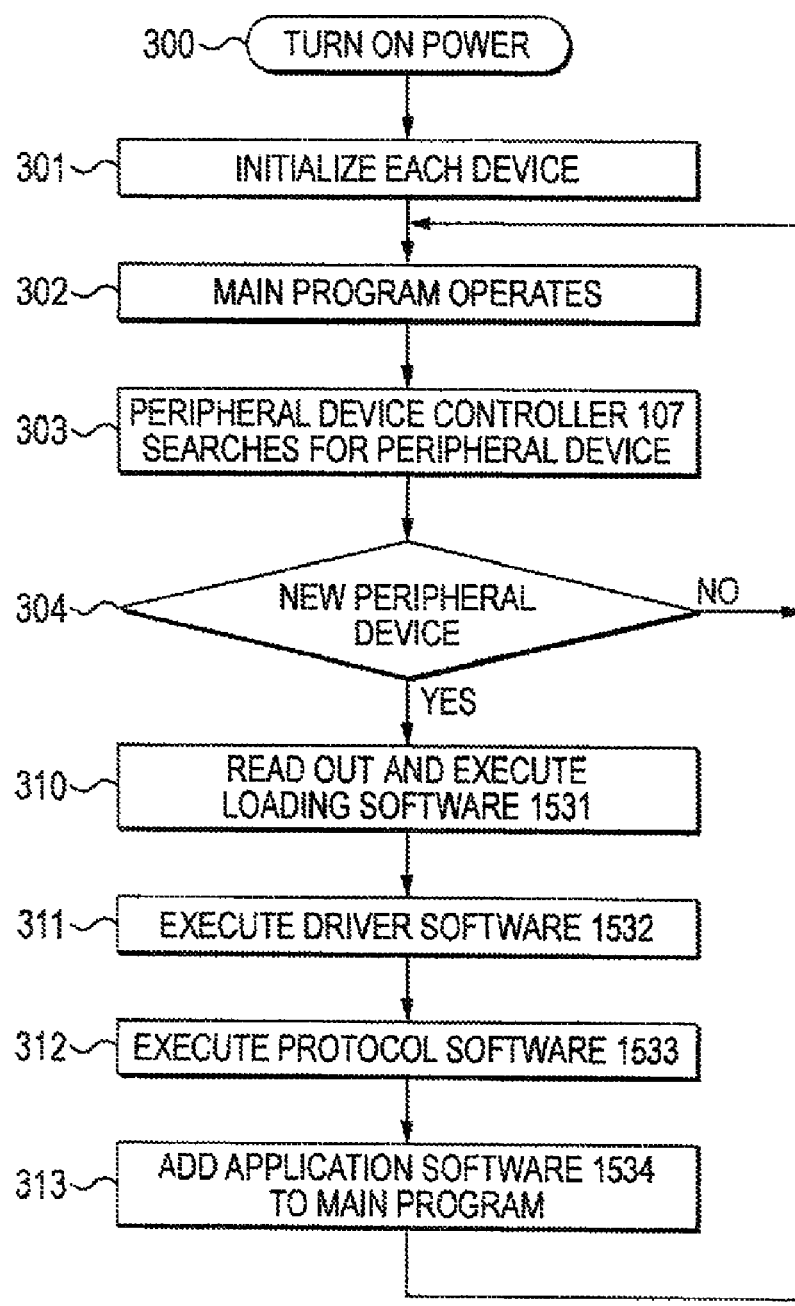
FIG. 3 is a flowchart showing the flow of software in the case of adding the network module of the information processing apparatus according to Embodiment 1.
Figure 4:
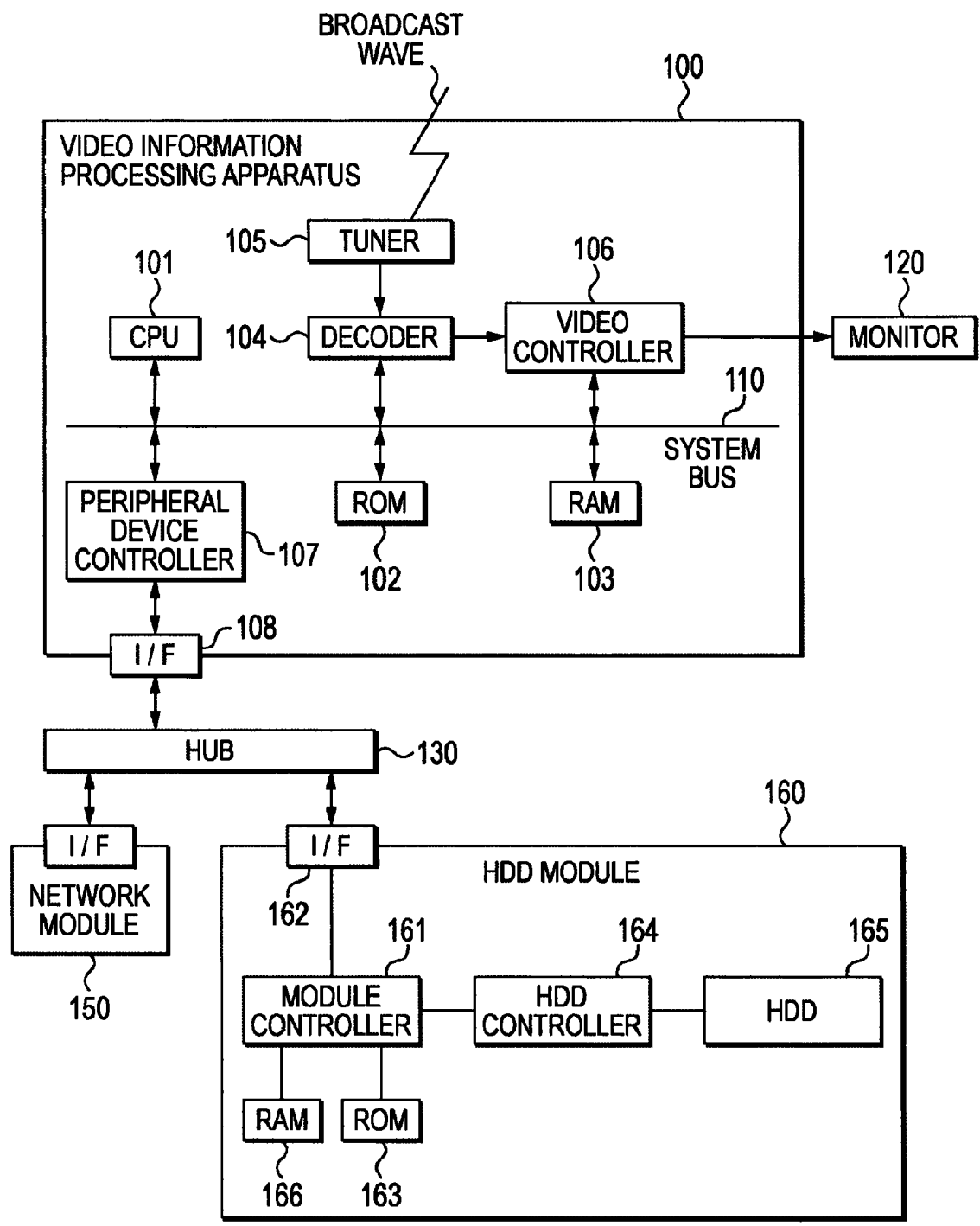
FIG. 4 is a configurational view showing the information processing apparatus according to Embodiment 3 of this invention.
Figure 5:
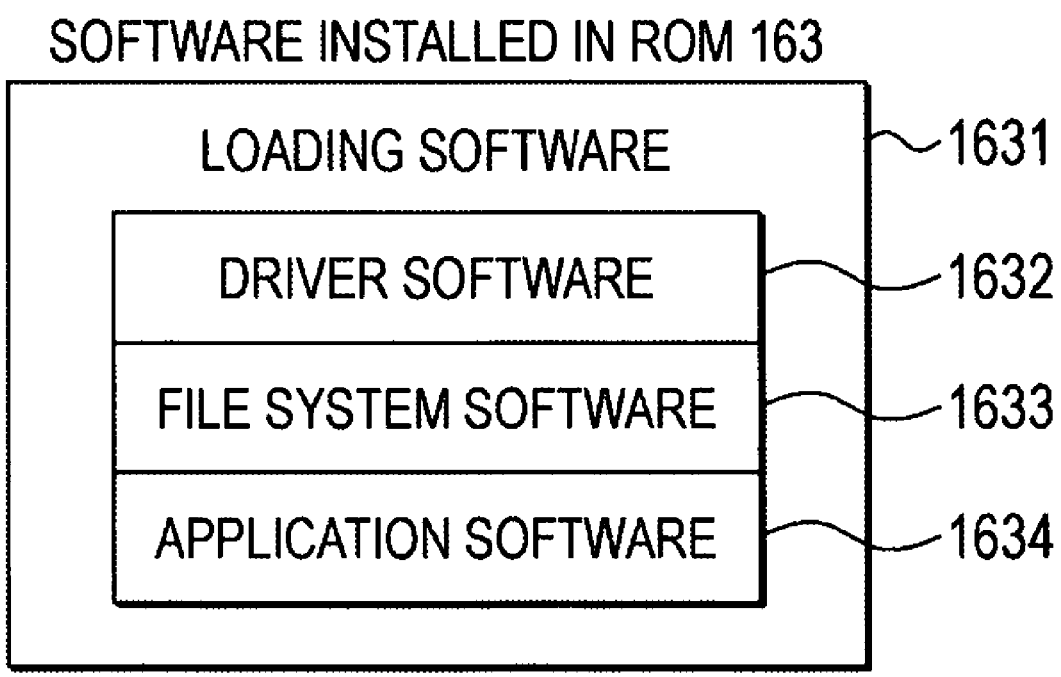
FIG. 5 is a view showing the configuration of the software installed in the ROM of the HDD module of the information processing apparatus according to Embodiment 3 of this invention.
Figure 6:
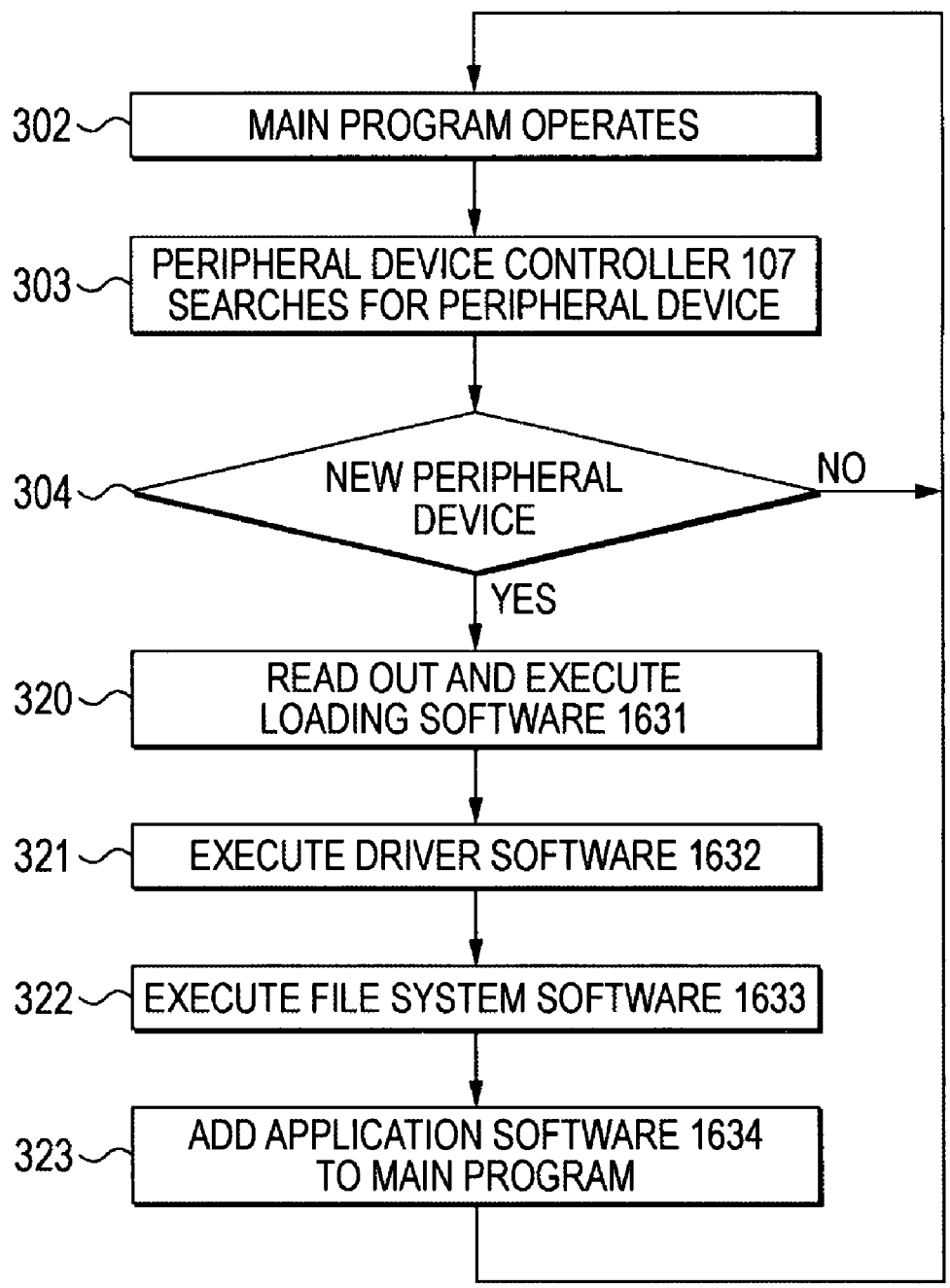
FIG. 6 is a flowchart showing the flow of software in the case of adding the HDD module of the information processing apparatus according to Embodiment 3 of this invention.
Figure 7:
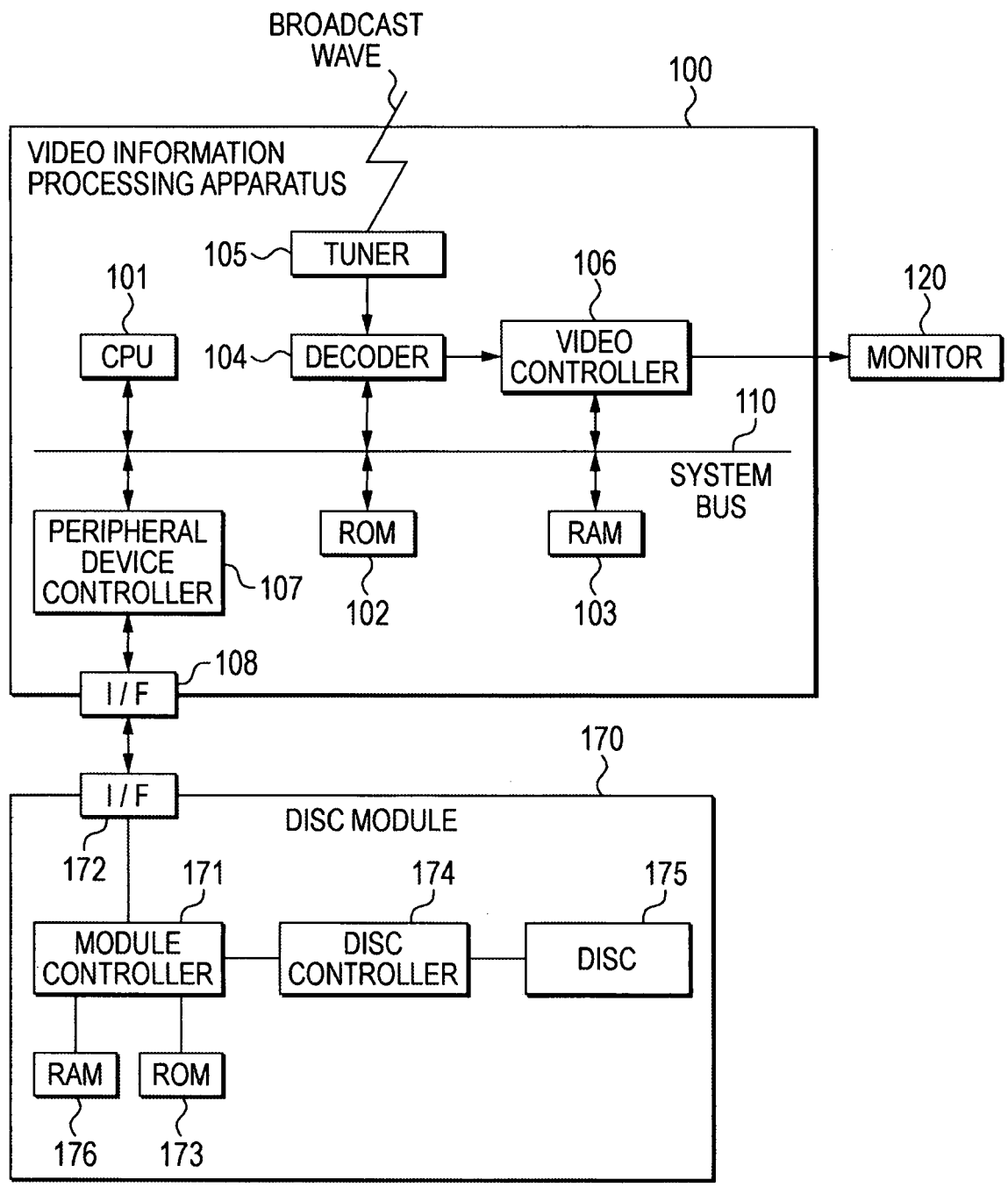
FIG. 7 is a configurational view showing the information processing apparatus according to Embodiment 4 of this invention.
Figure 8:
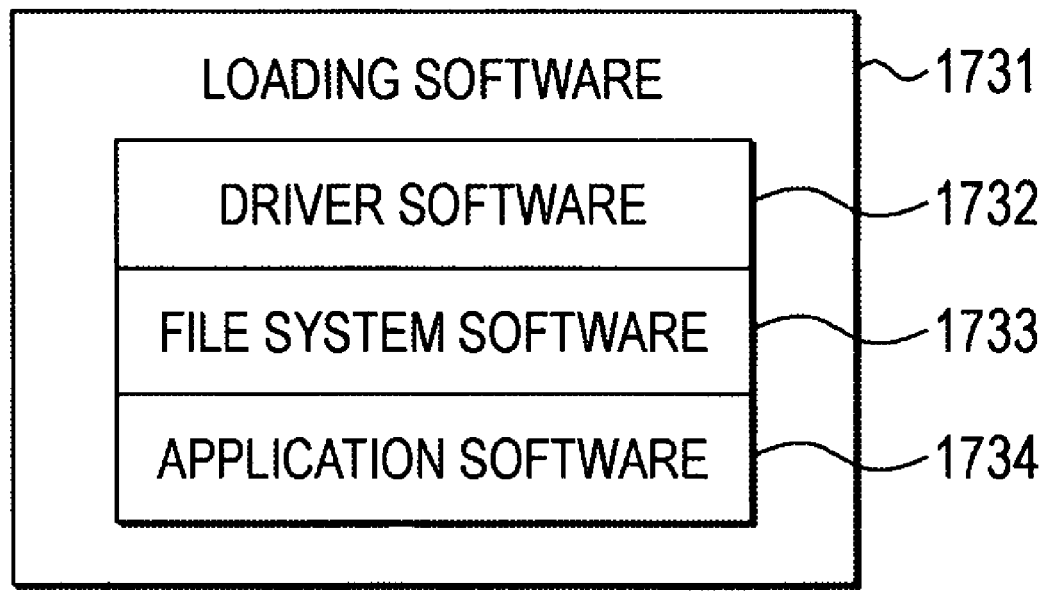
FIG. 8 is a view showing the configuration of the software installed in the ROM of the disc module of the information processing apparatus according to Embodiment 4 of this invention.
Figure 9:
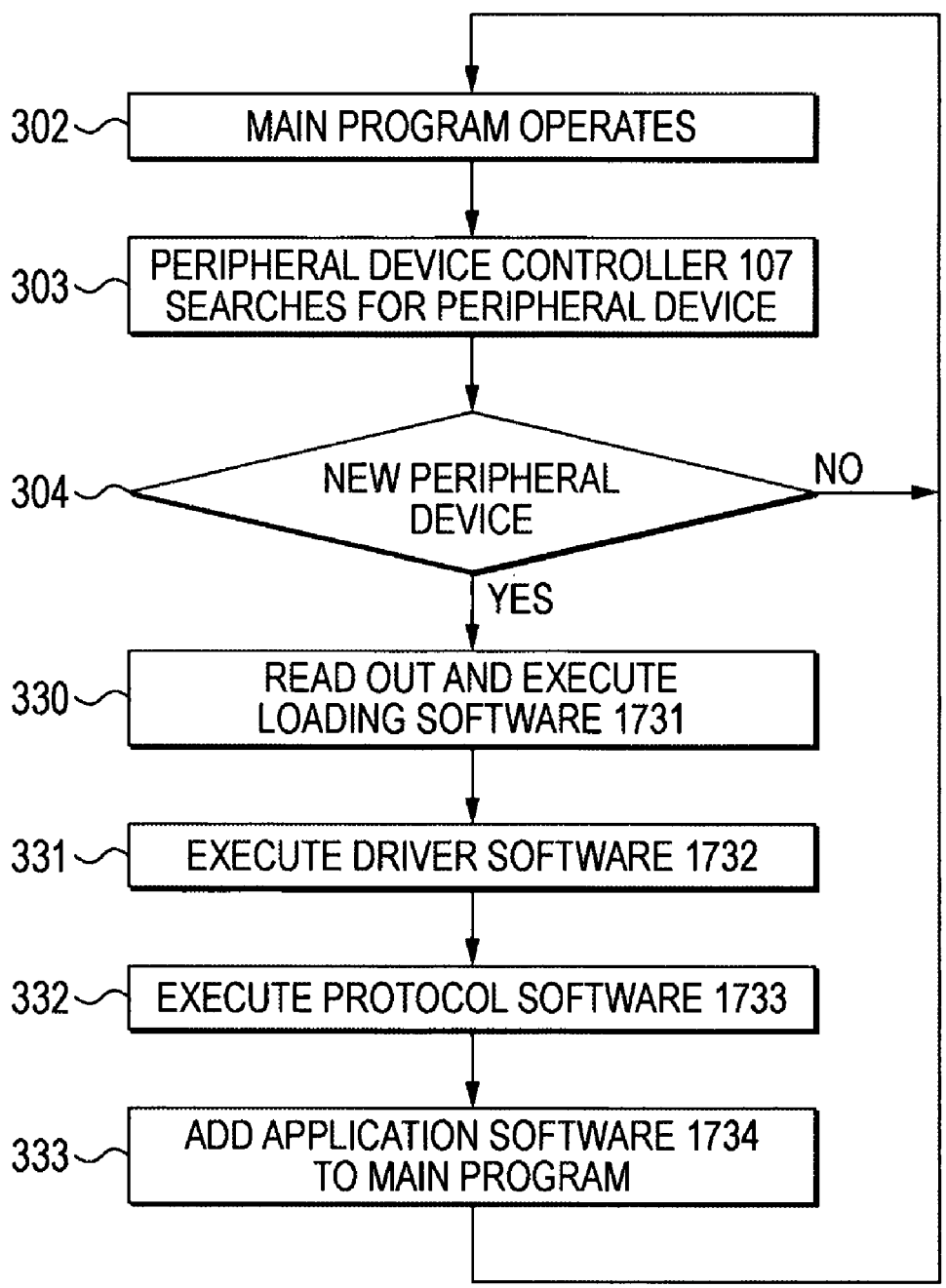
FIG. 9 is a flowchart showing the flow of software in the case of adding the disc module of the information processing apparatus according to Embodiment 4 of this invention.
Figure 10:
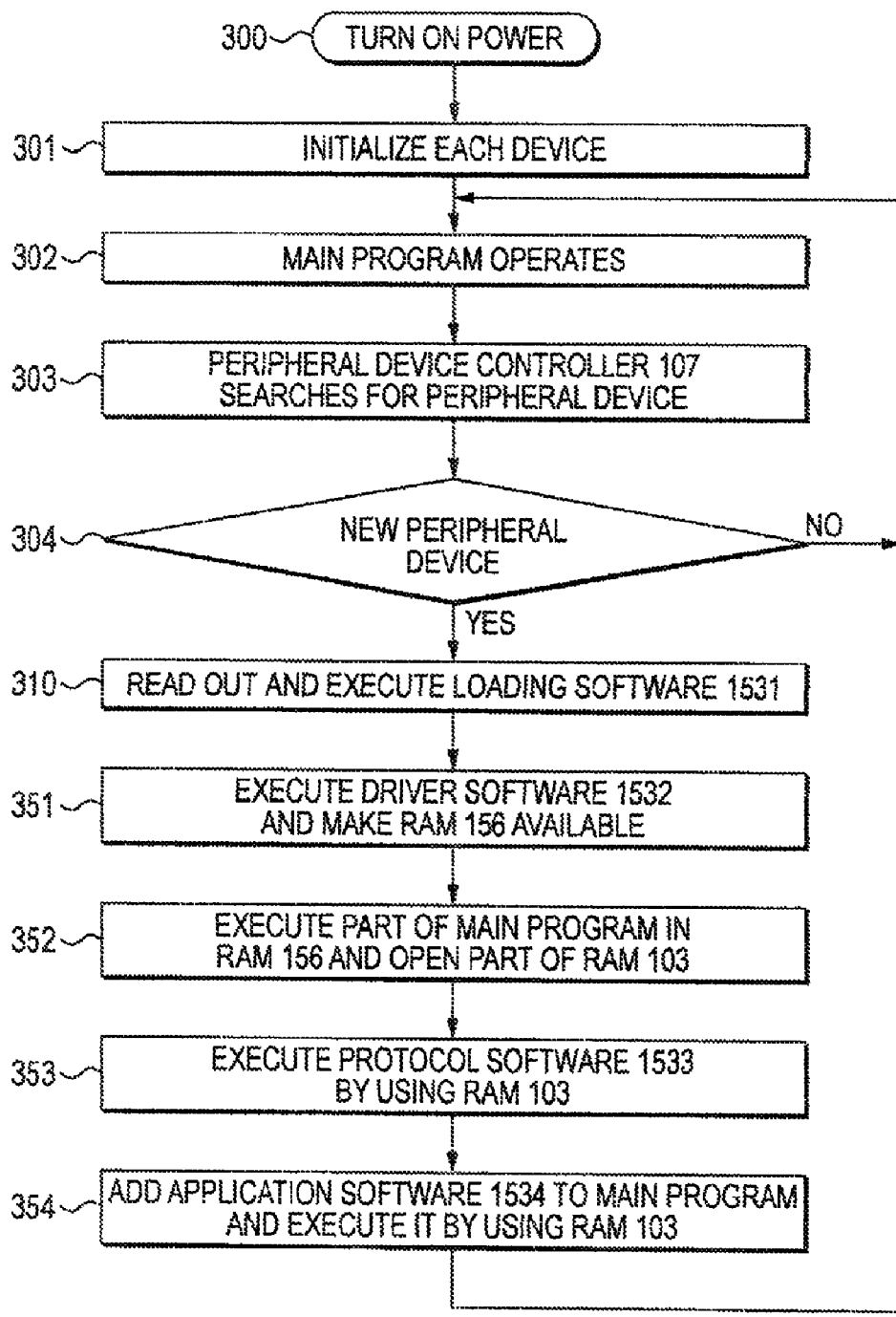
FIG. 10 is a flowchart showing the flow of software in the case of adding the network module of the information processing apparatus according to Embodiment 2 of this invention.

DESCRIPTION OF REFERENCE NUMERALS AND SIGNS 100 video information processing apparatus, 101 CPU, 102 ROM,
103 RAM, 104 decoder, 105 tuner,
106 video controller, 107 peripheral device controller,
108 interface, 110 system bus, 120 monitor,
150 network module, 151 module controller,
152 interface, 153 ROM,
154 network controller,
155 network interface, 156 RAM,
160 HDD module, 161 module controller,

162 interface, 163 ROM, 164 HDD controller,
165 HDD, 166 RAM,
170 disc module, 171 module controller,
172 interface, 173 ROM,
174 disc controller, 175 disc (CD, DVD, etc.)
176 RAM

The invention claimed is:

1. An information processing apparatus comprising:
a first module that has first control software installed therein and that has a CPU (central processing unit) for executing the installed first control software and a first memory; and
a second module connected to the first module, the second module having second control software for making the second module operate and a second memory,
wherein
the first module includes a memory use procedure program for making the second Memory available to the CPU of the first module and an execution memory shift program for making the first control software operate by using the second memory,
the first module has a peripheral device controller that detects connection of the second module,
when the connection of the second module is detected by the peripheral device controller, the CPU of the first module reads out the second control software from the second module, executes the read-out second control software, thereby making the second module operate, accesses the second memory in accordance with the memory use procedure program, and makes a change so that a program executed in the first memory will be executed in the second memory in accordance with the execution memory shift program, and
the second control software includes a third control software, and the third control software is controlled by the second control software to be executed in the first memory.

2. The information processing apparatus according to claim 1, wherein the second module has a device installed therein, and the second control software of the second module includes a control program for controlling the device installed in the second module, a use program for using the device, and a program for adding the control program and the use program to the first control software of the first module.

3. The information processing apparatus according to claim 1, wherein the first module has a device installed therein, and the second control software of the second module includes a control program for controlling the device installed in the first module.

4. An additional module control method comprising:
connecting a first module that has first control software installed therein and that has a CPU (central processing unit) for executing the installed first control software and a first memory, to a second module that has second control software and a second memory; and
utilizing the first module to control the second module,
wherein the second control software includes a third control software, and
wherein the first control software is executed in order to perform the steps of:
detecting the connection of the second module to the first module; and
reading out the second control software from the second module; and
executing the read-out second control software in order to:
make the second module operate,
access the second memory and make a change so that a program executed in the first memory will be executed in the second memory, and
execute the third control software in the first memory.

5. The method according to claim 4, wherein
the second module has a device installed therein,
the second control software of the second module includes a control program for controlling the device installed in the second module and a use program for using the device, and
the method further comprises, by means of the second control software being executed by the first control software, the steps of:
executing the control program for controlling the device installed in the second module; and
executing the use program for using the device.

6. The method according to claim 4, wherein
the first module has a device installed therein,
the second control software of the second module includes a control program for controlling the device installed in the first module, and
the method further comprises, by means of the second control software being executed by the first control software, the step of executing the control program for controlling the device installed in the first module.

* * * * *